June 4, 1946.  I. J. GRUENBERG  2,401,562
TRIMMING MECHANISM FOR FORMED ROTARY GRINDERS
Filed Nov. 13, 1943   5 Sheets-Sheet 1
FIG. 1.
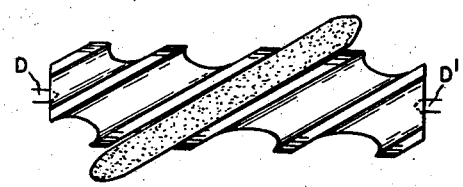
FIG. 2.
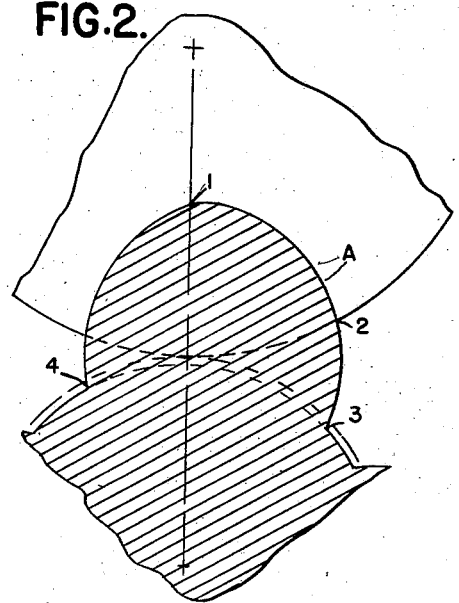
FIG. 3.
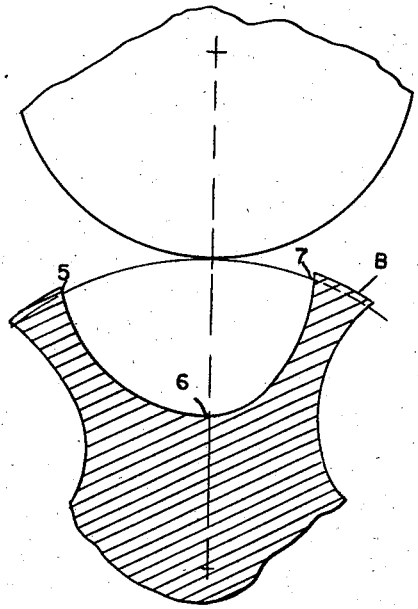
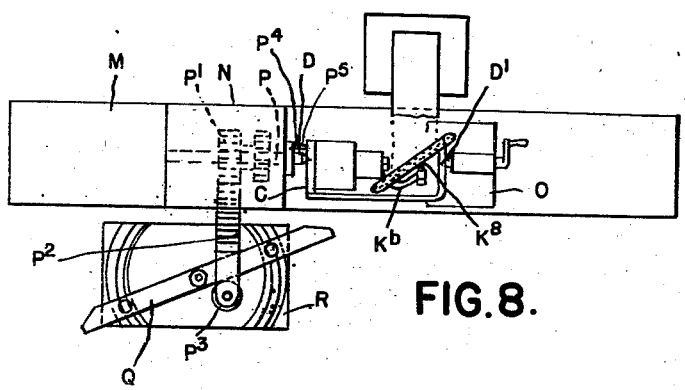
FIG. 8.
INVENTOR.
IVOR J. GRUENBERG
BY
ATTORNEYS June 4, 1946.  I. J. GRUENBERG  2,401,562
TRIMMING MECHANISM FOR FORMED ROTARY GRINDERS
Filed Nov. 13, 1943  5 Sheets-Sheet 2
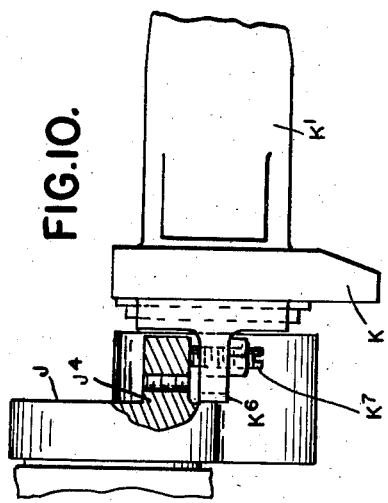
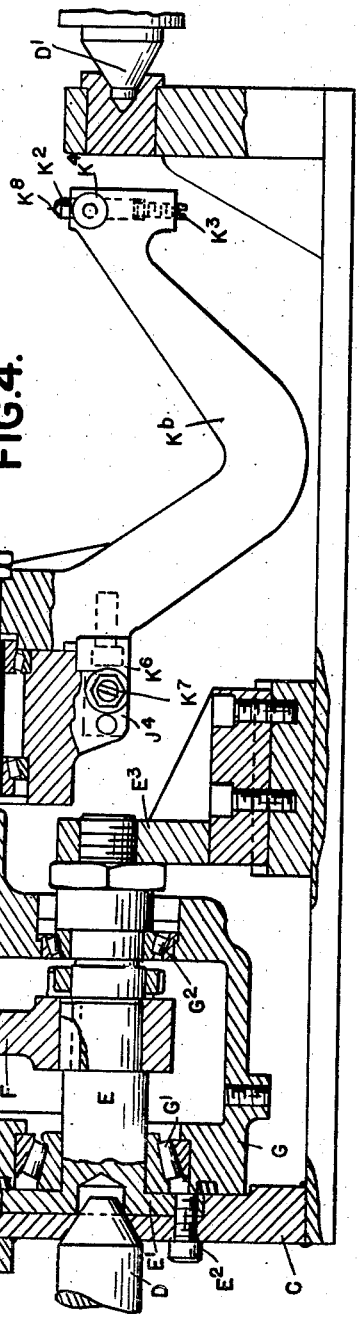
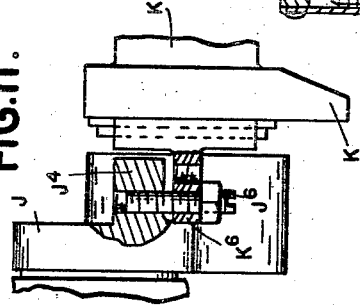
INVENTOR.
IVOR J. GRUENBERG
BY
Whittemore Hulbert & Belknap
ATTORNEYS June 4, 1946.   I. J. GRUENBERG   2,401,562
TRIMMING MECHANISM FOR FORMED ROTARY GRINDERS
Filed Nov. 13, 1943   5 Sheets-Sheet 4
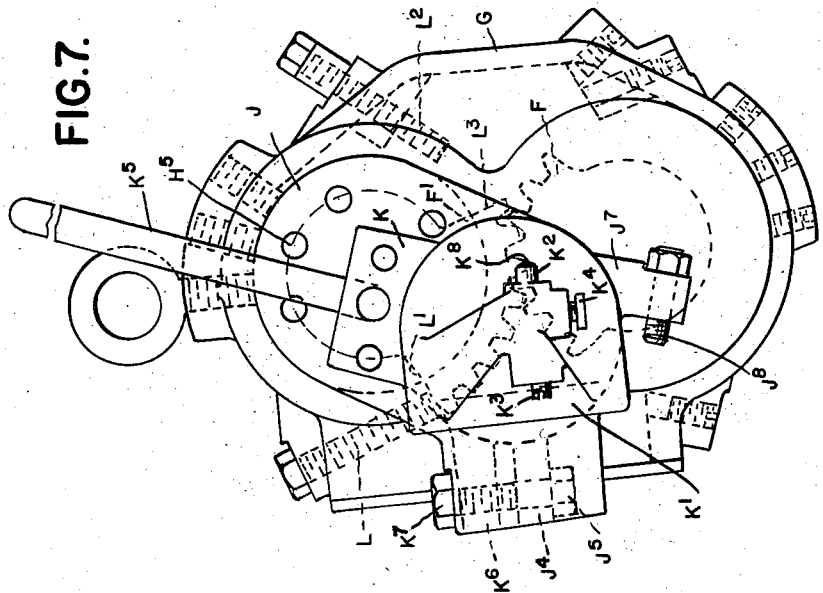
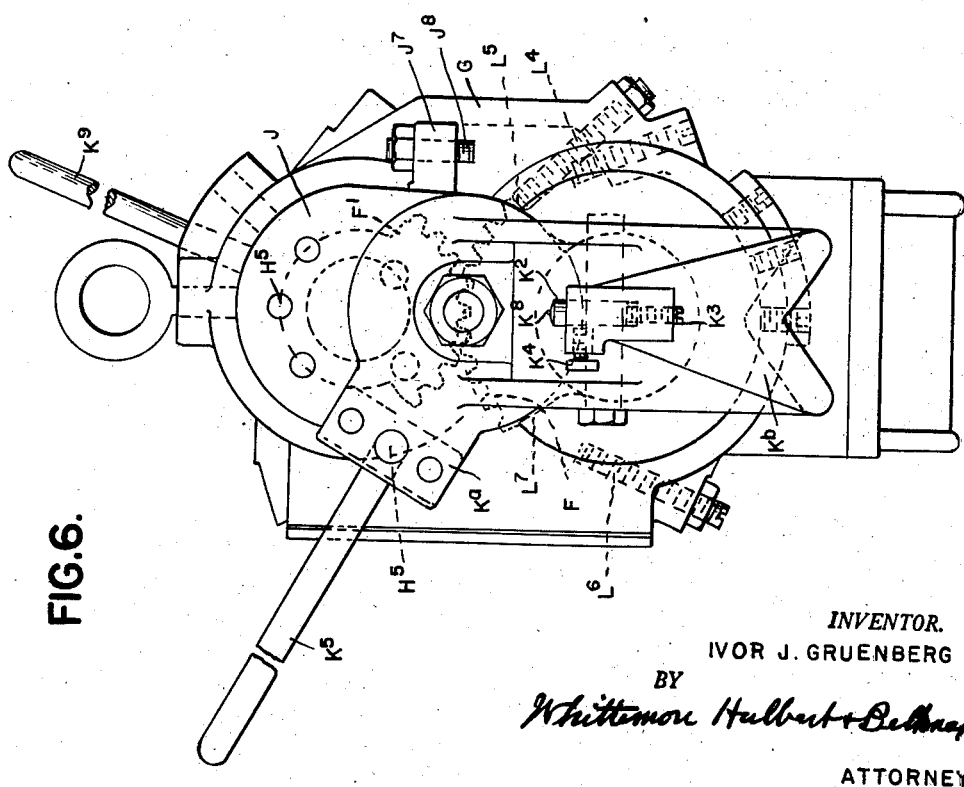
INVENTOR.
IVOR J. GRUENBERG
BY
ATTORNEYS

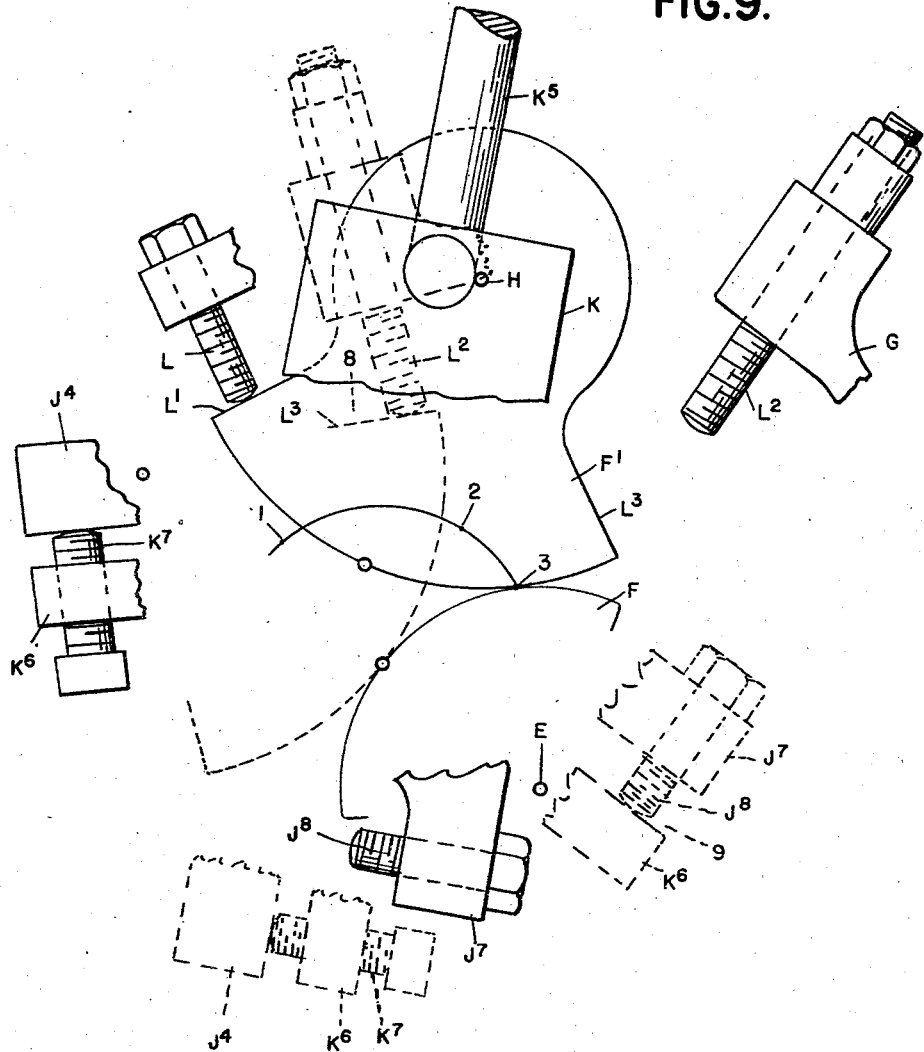

Patented June 4, 1946

2,401,562

UNITED STATES PATENT OFFICE 2,401,562

TRIMMING MECHANISM FOR FORMED ROTARY GRINDERS

Ivor J. Gruenberg, Pleasant Ridge, Mich., assignor to The Gear Grinding Machine Company, Hamtramck, Mich., a corporation of Michigan Application November 13, 1943, Serial No. 510,170

6 Claims. (Cl. 125—11)

The invention relates to mechanism for trimming or dressing grinder wheels and more particularly to a construction adapted to trim rotary grinders for the grinding of helicoidal surfaces such as helical gears or the like.

It is a primary object of the invention to obtain a construction of trimming mechanism which will develop in a grinder wheel the exact form required for grinding a predetermined helicoidal surface.

It is a further object to control said mechanism by a pattern corresponding to a predetermined cross sectional contour of the finished work.

With these objects in view, the invention consists, first, in a trimming mechanism in which a compound movement is imparted to a trimming point in relation to the grinder wheel to have an abrading action thereon such as would be performed by an abrading surface coincident with the finished surface of the work in its movement in relation to the grinder wheel during the grinding operation.

The invention further consists in a trimming mechanism in which a compound movement is imparted to the trimming point including a movement in a plane through a pattern corresponding to a predetermined cross sectional contour of the finished work.

The invention further consists in a trimming mechanism including means for constraining movement of the trimming point to a pattern corresponding to a cross sectional contour of the finished work together with means for moving said constraining means through a helical path.

The invention further consists in a trimming mechanism which is mounted on a reciprocatory work-holding table of a grinding machine in axial alignment with the work thereon so as to be movable through the same path, said mechanism also including means constraining the trimming point to move through a path in the plane of rotation corresponding to the cross sectional contour of the work in such plane.

The invention further consists in the specific construction of the constraining means through which the pattern is developed corresponding to the desired cross sectional contour in the work.

The invention further consists in various features of construction as hereinafter set forth.

In the drawings the construction specifically illustrated is designed for trimming arcuate and cycloidal contours. However, the invention is also applicable to the trimming of other contours in grinder wheels for grinding helicoidal members.

Fig. 1 is a diagram illustrating a helical member to be ground, a grinder wheel in operative relation thereto and the plane in which said grinder wheel is trimmed;

Figs. 2 and 3 are cross sections respectively through portions of male and female conjugate members having helical engagement with each other;

Fig. 4 is a longitudinal sectional elevation of the trimming mechanism for the female member;

Fig. 6 is an end elevation of Fig. 4;

Fig. 7 is an end elevation of Fig. 5; and

Fig. 8 is a plan view showing the trimmer mechanism mounted on the work holding centers of a grinding machine;

Fig. 9 is a diagram of the mechanism of Fig. 7 illustrating the operation of the same;

Fig. 10 is a bottom plan view showing the engagement between the trimming member and carrier;

Fig. 11 is a similar view showing a different adjustment.

Figure 5:
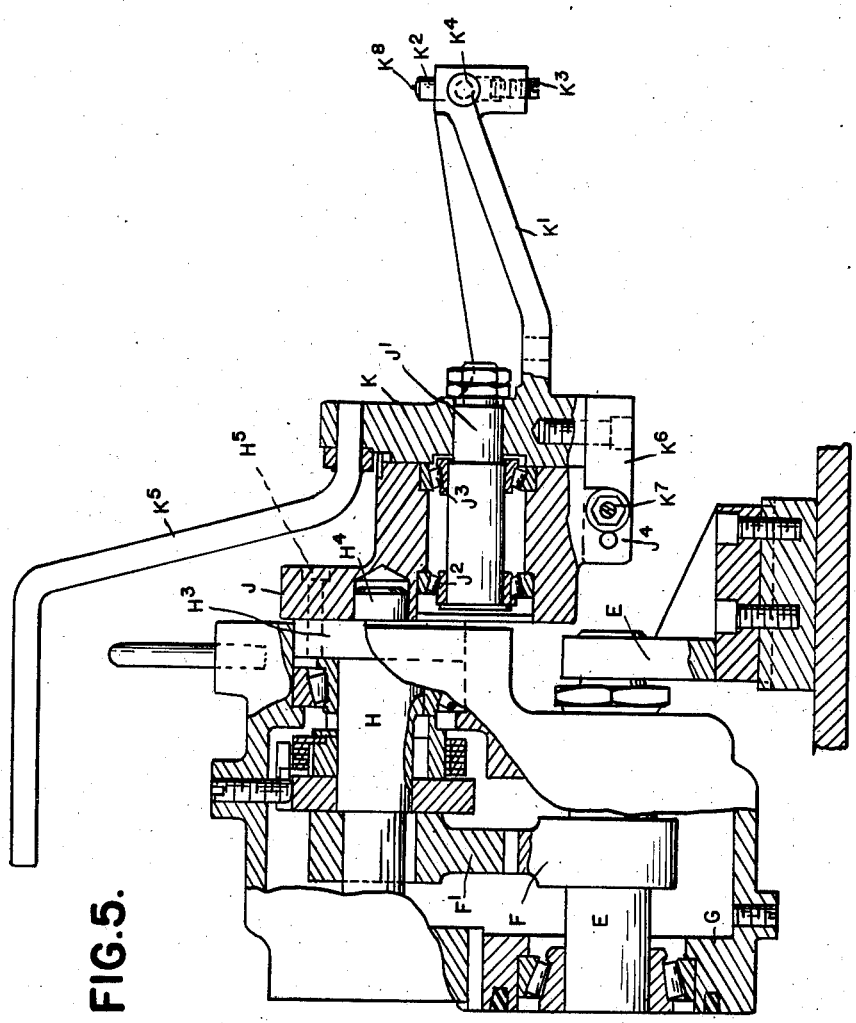
Fig. 5 is a similar view of the trimming mechanism for the male member.

The specific work to be ground illustrated in Figs. 1 to 3 comprises a pair of conjugate helicoidal members of the following construction. The male member A has a plurality of projecting helical teeth thereon, each of which in the plane of rotation is of a contour having on one side an arcuate portion between the points 1 and 2 and a tangent cycloidal portion between the points 2 and 3. On the opposite side there is a cycloidal portion between the points 1 and 4. The female member B shown in Fig. 3 has an arcuate portion between the points 5 and 6 and a cycloidal portion between the points 6 and 7. The cycloidal curves are based on the pitch circles of the respective members and are traced by trimming mechanisms of the following construction.

C is a frame which is adapted to be mounted on the reciprocatory work table in axial alignment with the same centers D and D' which support the work to be ground. Mounted in this frame with its axis coincident with the centers D and D' is a stationary shaft E having an integral head E' secured to the frame C by bolts $E^2$. The opposite end of the shaft E engages a bracket $E^3$ detachably secured to the frame. Intermediate its ends there is mounted on the shaft E a gear segment F having a pitch radius corresponding to the pitch circle of the work. This gear segment is keyed to the shaft so as to be held stationary therewith. G is a housing enclosing the gear segment F and rotatably mounted on the shaft E by roller bearings, G', G². In this housing is a shaft H rotatably mounted in roller bearings H', H² and having a head portion H³ projecting outside the housing. A pinion segment F' mounted on the shaft H and keyed thereto intermeshes with the gear segment F so that any angular movement of the housing G on the shaft E will cause a rolling of the pinion segment F' about the gear segment F. Such rolling movement is resiliently opposed by a helical torsion spring I, the opposite ends of which are attached respectively to the shaft H and to a collar I'. The collar I' is rotatably adjustable on said shaft and is anchored by a pin I³ threaded in the housing G and engaging one of a series of notches I⁴ in said collar. This permits of placing any desired tension on the spring by rotatably adjusting the collar I'.

The construction as thus far described is the same in both the trimmers for respectively fashioning the male and female grinder wheels. There is, however, a reversal in the position of the gear and pinion segments. Thus, for the female grinder the radius of the stationary gear is greater than the radius of the pinion, while in the male grinder the radius of the stationary gear is less than the radius of the pinion. The same gear segments may be used in both constructions, only their positions are reversed with respect to the shafts E and H.

Male trimmer

The trimmer which fashions the grinder wheel for grinding the male helicoidal member is briefly designated as the male trimmer and has in addition to the elements already described the following construction. J is a carrier member which is mounted on a projecting portion H⁴ of the shaft H and is also coupled to rotate with the head H³ by an eccentric pin H⁵. J' is a shaft mounted in the carrier J to be freely revoluble in radial and end thrust roller bearings J² and J³. K is a diamond carrier which is secured to the outer end of the shaft J' and is provided with an arm K' extending forward to the plane in which the trimming is to be performed. The holder K² for the diamond K⁸ is mounted at the free end of the arm K' being adjusted by a screw K³ and locked in adjusted position by a set screw K⁴. The member K has also connected thereto a handle K⁵ which extends radially outward and rearward into a position for convenient operation. K⁶ is a lug secured to the member K to extend in overlapping relation to a lug J⁴ on the member J. A screw K⁷ in the lug K⁶ forms an adjustable stop for engaging the lug J⁴ and a removable screw J⁶ is used for connecting the lugs K⁶ and J⁴ together for certain trimming operations. There is also a second lug J⁷ on the member J which is spaced from the lug J⁴ and is on the opposite side of the lug K⁶. J⁸ is an adjustable screw in the lug J⁷ forming a stop for the lug K⁶.

The housing G is provided with a number of adjustable screws functioning as stops for limiting the amount of angular movement of the housing G on the shaft E and for positioning it in relation to the gear segments F and F'. One of these screws L is adapted to engage a shoulder L' on the pinion F' and will limit the rocking movement of said pinion in relation to the housing G when the latter rotates in a clockwise direction (Figs. 7 and 9). Another screw L² engages a shoulder L³ on the pinion F' when the housing rotates in a counter-clockwise direction. The screw J⁸ in the lug J⁷ when contacted by the lug K⁶ limits the free rocking movement of the member J. The construction is such that when the handle K⁵ is moved from the position shown in Fig. 7 and in full lines, Fig. 9, in a counter-clockwise direction, there will be the following sequence of operations.

The handle K⁵ directly actuates the member K, arm K', diamond holder K² and diamond point K⁸, the latter being initially in alignment with the point of tangency between the pitch circles of the gear wheel F and pinion F'. The movement of the member K permits the simultaneous movement of the member J under actuation of the torsion spring I (which has been previously tensioned) or, if desired, a second handle K⁹ secured to the housing G may be grasped by the operator together with the handle K⁵. This maintains the screw K⁷ in contact with the lug J⁴ so that the members J and K rotate together. However, as the member J is rotatively fixed to the shaft H and as the pinion F' fixed on said shaft is in mesh with the stationary gear F, this will cause the pinion to roll about the gear carrying the housing G with it. The housing rotates upon the shaft E and travels with the movement of translation of the pinion F' but the pinion has additional movement, viz., a rotation about its own axis. As a consequence, there is a relative movement between the pinion F' and the housing G which brings the shoulder L³ on said pinion into engagement with a stop screw L² as indicated in dotted lines at 8, Fig. 9. This prevents further movement of the pinion and housing G but the member K can still rotate under the actuation of the handle K⁵ until the lug K⁶ contacts with the screw J⁸ as indicated in dotted lines at 9, Fig. 9. The effect of the movements just described is that the diamond point K⁸ will trace a cycloidal curve during the period when the members K and J are rotating together, said curve being the line 3—2, Fig. 9. In the continued movement of the member K independently of the member J, the diamond point K⁸ will trace an arcuate curve or line 2—1, Fig. 9. Thus, the entire curve is the same as shown in Fig. 2 between the points 3 and 1. By adjustment of the screws K⁷, L and L², the lengths of the cycloidal and arcuate portions of the curve may be varied or, if desired, the whole curve can be made cycloidal by connecting the lugs J⁴ and K⁶ to each other by a second screw J⁶.

The grinding of the opposite side of the tooth of the male member is performed by a separate grinder wheel which is trimmed by operations similar to those above described. However, inasmuch as the curve is the cycloid 1—4, Fig. 2, the stop screw L² must be adjusted outward from the position shown in Fig. 9. This will permit a greater angular movement of the housing about the shaft E before the shoulder L³ of the pinion F' contacts with the screw L². While the trimmed surfaces of the two grinder wheels both face the same way, they can be used for grinding opposite sides of the tooth by reversing the work end for end on its supporting centers.

Female trimmer

The female trimming mechanism is similar to that of the male trimming mechanism above described with the following differences. First, the positions of the gears F and F' are reverse, the one of larger radius being engaged with the stationary shaft E while the one of smaller radius is attached to the shaft H. The member K is exchanged for a similar member K$^a$ having a bent arm K$^b$ which carries the diamond holder and provides clearance for the trimming movement. A screw L$^4$ in the housing G abuts against the shoulder L$^5$ on the stationary gear F and the spring I normally holds the parts in this position shown in Fig. 6. A screw L$^6$ on the left-hand side of the housing is adapted to contact with a shoulder L$^7$ on the stationary gear after a predetermined movement of said housing in a clockwise direction. On the right-hand side the screw J$^8$ in the lug J$^7$ previously described, forms a stop for contact with the lug K$^6$ and limits movement of the member K in a counter-clockwise direction. The diamond point K$^8$ in the position Fig. 6, is at the point 6 of the curve, Fig. 3. Therefore, movement of the handle K$^5$ in a clockwise direction will cause said point to trace an arcuate curve corresponding to the curve 6—5, Fig. 3. On the other hand, movement of the point K$^8$ from the position, Fig. 6, in a counter-clockwise direction will cause said point to trace a cycloidal curve corresponding to the curve 6—7, Fig. 3. The length of this curve is limited by the contact of the screw J$^8$ with the lug K$^7$ as was the case with the construction previously described.

Mounting for the trimming mechanism

As previously stated, the frame C of the trimming mechanism is mounted on the work holding centers D and D' of a grinding machine, or in axial alignment therewith. This grinding machine is designed for the grinding of helical gears or other helicoidal surfaces, but its specific construction is not the subject matter of the instant invention. In general, this machine is provided with a reciprocatory work holding table M on which are mounted the head stock N and tail stock O which, respectively, carry the centers D and D'. The head stock is provided with a rotary spindle P which is actuated through a gear train P' by a transversely extending rack bar P$^2$. The outer end of this rack bar has a roller P$^3$ which engages an inclined bar Q on a stationary table or frame R. The arrangement is such that when the table M is reciprocated, a rotary movement will be simultaneously imparted to the spindle P such as to move the trimming mechanism (or work) through a helical path in relation to the grinder wheel S. This wheel is mounted on a stationary portion of the grinding machine and is set at an angle to the axis of the centers D and D' which is substantially the same as the helical angle of the work. Consequently, when the table M reciprocates, there will be a movement of the work relative to the grinder wheel such as to cause a relative advancement of the latter longitudinally through the helical groove between opposed helicoidal surfaces. When the trimming mechanism is mounted on the centers D and D' or other mounting in axial alignment therewith, it will be given the same movement as is imparted to the work when on said centers. The spindle P has a head P$^4$ at its forward end which is coupled to the frame C by a pin or dog P$^5$, thereby causing said frame to rotate with the spindle.

Operation

In the operation of trimming the grinder wheel for grinding the specific helicoidal members shown in Figs. 2 and 3, the procedure is as follows: For grinding the male member, Fig. 2, separate grinder wheels are trimmed to the contours respectively on the right and on the left of the center line. The portion of the curve to the right, Fig. 2, is trimmed by movement of the handle K$^5$ in a counter-clockwise direction, Fig. 7. The diamond point K$^8$ starts from the point 3 on the pitch circle and traces a cycloidal curve between 3 and 2 and then an arcuate curve between 2 and 1. The curve on the left, Fig. 2, starts from the point 4 and is a continuous cycloid to the point 1. For grinding the female member, Fig. 3, a single grinder wheel is employed and an arcuate curve is traced between the points 6 and 5 and a cycloidal curve between the points 6 and 7. The movement just described would not alone fashion the grinder wheel to a form which would reproduce these curves in the work. In fact, a grinder wheel trimmed to this contour in any cross sectional plane thereof would cause interference in the grinding operation which would destroy such contour. However, when the trimming mechanism is mounted as described in the last paragraph and is moved through a helical path while at the same time an oscillatory movement is imparted to the trimming point by the actuation of the handle K$^5$, a form will be generated in the grinder wheel which will grind the work to the desired contour.

Before starting the trimming operation, the table M is moved to a position (by manually operable means not shown) where the trimming point K$^8$ is at one end of the curve which it is to trace. As shown in Fig. 8, the grinder wheel to be trimmed is for grinding the female member, and the trimming point K$^8$ is located at one side of this wheel. It is then oscillated through movement of the handle K to trim a short length of the curve. If there were no movement of the table M the point K$^8$ would soon pass out of contact with the wheel, but if the table is moved slightly forward the point will again be brought in contact with the grinder wheel to trim by its oscillation another portion of the curve. This action is continued to progressively trim successive portions of the curve until the trimming point arrives at the end of the curve on the opposite side of the grinder wheel. It would, of course, be possible to automatically oscillate the handle K$^5$ in timed relation to the movement of the table M and rotation of the trimming mechanism with the spindle P.

Summary

My improved trimming mechanism performs a function in the fashioning of the grinder wheel which is similar to that which would be performed by an abrasive surface coincident with the finished surface of the work in the relative movement of the latter to the grinder wheel. The form actually imparted to the grinder wheel is not the same in successive trimming operations, for the radius of the wheel is a factor which is involved. However, regardless of the radius of the wheel and the form imparted thereto, the grinding of the work will always be the same and will impart the exact cross sectional contour desired.

While I have described my trimming mechanism designed for fashioning grinder wheels, it is obvious that it would be capable of fashioning other rotary cutting tools, such for instance as milling cutters.

What I claim as my invention is:

1. In a trimming mechanism for rotary tools, the combination with a frame, two arcuate members mounted therein, one fixed thereto and the other constrained to roll about the periphery of the first, a trimmer point mounted on the rolling member to move therewith and to trace a cycloidal curve, and a pivot in said last mentioned mounting permitting a limited rotation of said trimmer point about a different center when said rolling member is stationary to trace an arcuate curve.

2. In a trimming mechanism for rotary tools, the combination with a frame, two arcuate members mounted therein, one fixed thereto and the other constrained to roll about the periphery of the first, a trimmer point mounted on said rolling member to move therewith, and a pivot in said last mentioned means permitting the independent rotation of said trimmer point about a different center in alignment with a point of tangency of said arcuate members.

3. In a trimming mechanism for rotary tools, the combination with a frame, of two arcuate members, one fixed to said frame and the other constrained to roll about the first, a trimmer member carrying a trimmer point and mounted on said rolling member to be independently rotatable about an eccentric axis, means for causing said rolling member and trimmer member to move together whereby said trimmer point will trace a cycloidal curve, and means for independently rotating said trimmer member about said eccentric axis to trace an arcuate curve.

4. In a trimming mechanism for rotary tools, the combination with a frame, of two arcuate members, one fixed to said frame and the other constrained to roll about the first, a trimmer member mounted on said rolling member to be rotatable about an eccentric axis thereon, cooperating overlapping shoulders on said trimmer member and rolling member to limit relative movement thereof in one direction, resilient means for yieldably holding said shoulders in contact during a portion of the movement of said trimmer member, and a stop for arresting movement of said rolling member while permitting continued movement of said trimmer member about said eccentric axis.

5. A trimmer member for rotary tools comprising a frame adapted for axial and rotative reciprocation, a shaft rigidly mounted in said frame concentric with the axis thereof, a gear segment fixed on said shaft, a second frame pivotally mounted on said shaft, a second shaft journalled in said second frame, a gear segment fixed on said second shaft in mesh with and rollable about said first gear segment, a carrier mounted and fixed upon said second shaft, a pivot mounted on said carrier with its axis in alignment with the pitch circle of said rollable gear segment, a trimmer member mounted on said pivot, opposed overlapping shoulders on said carrier and trimmer, resilient means for yieldably holding said shoulders in contact whereby said carrier member and trimmer member move together, an adjustable stop for limiting movement of said carrier, and a second adjustable stop for limiting the independent rotation of said trimmer.

6. A trimming mechanism for rotary tools comprising a frame adapted for axial and rotative reciprocation, a shaft rigidly mounted in said frame concentric with the axis thereof, a gear segment fixed on said shaft, a second frame pivotally mounted on said shaft, a second shaft journalled in said second frame, a gear segment fixed on said second shaft in mesh with and rollable about said first gear segment, a carrier mounted and fixed upon said second shaft, a pivot mounted in said carrier with its axis in alignment with a pitch circle of said rotatable gear segment, a trimmer member mounted on said pivot, relatively adjustable opposed overlapping shoulders on said carrier and trimmer, means for applying resilient torque to said second shaft to yieldably press the shoulder on said carrier against the shoulder on said trimmer, a handle on said trimmer member for manually rotating the same.

IVOR J. GRUENBERG.